United States Patent
Teo (10) Patent No.: US 8,819,387 B2
(45) Date of Patent: Aug. 26, 2014

(54) MEMORY STORAGE DEVICE, MEMORY CONTROLLER, AND METHOD FOR IDENTIFYING VALID DATA

(75) Inventor: Wei-Chen Teo, Miaoli County (TW)

(73) Assignee: Phison Electronics Corp., Miaoli (TW)

( * ) Notice: Subject to any disclaimer, the term of this patent is extended or adjusted under 35 U.S.C. 154(b) by 405 days.

(21) Appl. No.: 13/227,479

(22) Filed: Sep. 8, 2011

(65) Prior Publication Data

US 2013/0013885 A1    Jan. 10, 2013

(30) Foreign Application Priority Data

Jul. 8, 2011  (TW) .............................. 100124253 A (51) Int. Cl.
G06F 12/06 (2006.01)
G06F 12/10 (2006.01)
G06F 12/02 (2006.01)

(52) U.S. Cl.
CPC ............ G06F 12/0246 (2013.01); G06F 12/06 (2013.01); G06F 12/10 (2013.01); G06F 2212/7201 (2013.01); G06F 2212/7209 (2013.01)
USPC .... 711/202; 711/103; 711/165; 711/E12.058; 711/E12.078

(58) Field of Classification Search
CPC ..... G06F 12/0246; G06F 12/06; G06F 12/10; G06F 2212/7201; G06F 2212/7209
See application file for complete search history.

(56) References Cited

U.S. PATENT DOCUMENTS

| | | | |
|---|---|---|---|
| 2009/0150597 A1* | 6/2009 | Yang et al. | 711/103 |
| 2009/0172256 A1* | 7/2009 | Chu et al. | 711/103 |
| 2009/0235014 A1* | 9/2009 | Yim et al. | 711/103 |
| 2009/0271567 A1* | 10/2009 | Huang | 711/103 |
| 2010/0070735 A1 | 3/2010 | Chen et al. | |
| 2010/0118587 A1* | 5/2010 | Chen et al. | 365/148 |
| 2010/0287327 A1* | 11/2010 | Li et al. | 711/103 |
| 2012/0254511 A1* | 10/2012 | Yeh | 711/103 |

FOREIGN PATENT DOCUMENTS

TW    200917021    4/2009

* cited by examiner

*Primary Examiner* — Michael Krofcheck
(74) *Attorney, Agent, or Firm* — Jianq Chyun IP Office (57) ABSTRACT

A memory storage device, a memory controller, and a method for identifying a valid data are provided. A rewritable non-volatile memory chip of the memory storage device includes physical blocks. Each of the physical blocks has physical pages. In the present method, logical blocks are configured and mapped to a portion of the physical blocks, wherein each of the logical blocks has logical pages. When a data to be written by a host system into a specific logical page is received, a substitute physical block is selected, the data is written into a specific physical page in the substitute physical block, and the address of a physical page in which a previous data corresponding to the specific logic page is written is recorded into the specific physical page. Thereby, a physical page containing the latest valid data can be identified among several physical pages corresponding to a same logical page.

27 Claims, 8 Drawing Sheets

MEMORY STORAGE DEVICE, MEMORY CONTROLLER, AND METHOD FOR IDENTIFYING VALID DATA

CROSS-REFERENCE TO RELATED APPLICATION

This application claims the priority benefit of Taiwan application serial no. 100124253, filed on Jul. 8, 2011. The entirety of the above-mentioned patent application is hereby incorporated by reference herein and made a part of this specification.

BACKGROUND

1. Technology Field

The present invention generally relates to a method for identifying valid data, and more particularly, to a method for identifying valid data after a power failure, and a memory storage device and a memory controller using the same.

2. Description of Related Art

Flash memory is broadly applied to various electronic devices thanks to its many advantages, such as data non-volatility, low power consumption, small volume, and non-mechanical structure. Besides, flash memory is adopted by many portable storage devices, such as memory cards and flash drives, as their storage media.

Generally, a flash memory in a memory storage device is divided into a plurality of physical blocks, and these physical blocks are grouped into a data area and a spare area. Physical blocks in the data area are used for storing valid data written by write commands, and physical blocks in the spare area are used for substituting the physical blocks in the data area when the write commands are executed. To be specific, when a memory storage device receives a write command from a host and accordingly is about to write data into a physical block in the data area, the memory storage device selects a physical block from the spare area and writes old valid data in the physical block in the data area and the new data into the physical block selected from the spare area. Besides, the memory storage device links the physical block containing the new data to the data area and erases the physical block originally in the data area and links it to the spare area.

In order to accomplish the operation described above, the memory storage device provides logical blocks to the host to allow the host to access data. To be specific, the memory storage device maintains a logical block-physical block mapping table for recording the mapping relationship between the logical blocks and the physical blocks in the data area. Meanwhile, when the memory storage device executes a write command therefore alternates a physical block in the data area and a physical block in the spare area, the memory storage device updates the logical block-physical block mapping table to make sure that subsequently data can be successfully accessed.

However, in order to increase data writing speed and avoid meaningless data moving operations, after the memory storage device selects the physical block from the spare area and writes the old valid data in the physical block in the data area and the new data into the physical block selected from the spare area, it does not instantly move all the valid data in the physical block in the data area to the physical block selected from the spare area or erase the physical block in the data area, so that a temporary mother-child relationship is maintained between the physical block in the data area and the physical block selected from the spare area. Herein the physical block in the data area is referred to as a mother physical block, and the physical block selected from the spare area is referred to as a child physical block. However, because every time the host writes a data of different quantity, in order to make the writing operations more efficient, a mother physical block may have multiple child physical blocks at the same time (for example, child physical blocks for writing continuous data and child physical blocks for writing data of small quantities). Accordingly, physical pages respectively belonging to different physical blocks may be mapped to the same logical page.

A memory storage device usually maintains a record table to record the latest physical page corresponding to each logical page. However, the record table may be lost or the content thereof may not be updated in time when a power failure occurs. When the power supply is resumed, even though the physical page corresponding to a specific logical page can be determined, in which physical page the latest valid data of the logical page is stored cannot be determined.

Nothing herein should be construed as an admission of knowledge in the prior art of any portion of the present invention. Furthermore, citation or identification of any document in this application is not an admission that such document is available as prior art to the present invention, or that any reference forms a part of the common general knowledge in the art.

SUMMARY

Accordingly, the present invention is directed to a valid data identification method, in which where a valid data is recorded can be correctly identified after the power supply of a memory storage device is abnormally terminated and then resumed.

The present invention is directed to a memory controller which can correctly identify where a valid data is recorded after the power supply of a memory storage device is abnormally terminated and then resumed.

The present invention is directed to a memory storage device which can correctly identify where a valid data is recorded after the power supply of the memory storage device is abnormally terminated and then resumed.

The present invention provides a valid data identification method adapted to a memory storage device having a rewritable non-volatile memory chip. The rewritable non-volatile memory chip includes a plurality of physical blocks, each of the physical blocks includes a plurality of physical pages, each of the physical pages includes a data bit area and a redundant bit area, and the physical blocks are grouped into at least a data area and a spare area. The valid data identification method includes configuring a plurality of logical blocks to be mapped to the physical blocks in the data area, wherein each of the logical blocks includes a plurality of logical pages. The valid data identification method also includes receiving a data to be written by a host system into a specific logical page among the logical pages, selecting a substitute physical block, writing the data into a specific physical page in the substitute physical block, and recording the address of a physical page in which a previous data corresponding to the specific logical page is written into the specific physical page, wherein the substitute physical block is selected from the spare area and mapped to the logical block corresponding to the specific logical page.

The present invention provides a memory controller for managing a rewritable non-volatile memory chip in a memory storage device. The rewritable non-volatile memory chip includes a plurality of physical blocks, each of the physical blocks includes a plurality of physical pages, and each of the physical pages includes a data bit area and a redundant bit area. The memory controller includes a host system interface, a memory interface, and a memory management circuit. The host system interface is configured to couple to a host system. The memory interface is configured to couple to the rewritable non-volatile memory chip. The memory management circuit is coupled to the host system interface and the memory interface. The memory management circuit groups the physical blocks into at least a data area and a spare area and configures a plurality of logical blocks to be mapped to the physical blocks in the data area, wherein each of the logical blocks includes a plurality of logical pages. The memory management circuit also receives a data to be written by the host system into a specific logical page among the logical pages through the host system interface, selects a substitute physical block, writes the data into a specific physical page in the substitute physical block, and records the address of a physical page in which a previous data corresponding to the specific logical page is written into the specific physical page, wherein the substitute physical block is selected from the spare area and mapped to the logical block corresponding to the specific logical page.

The present invention further provides a memory storage device including a rewritable non-volatile memory chip, a connector, and a memory controller. The rewritable non-volatile memory chip includes a plurality of physical blocks, each of the physical blocks includes a plurality of physical pages, and each of the physical pages includes a data bit area and a redundant bit area. The connector is configured to couple to a host system. The memory controller is coupled to the rewritable non-volatile memory chip and the connector. The memory controller groups the physical blocks into at least a data area and a spare area and configures a plurality of logical blocks to be mapped to the physical blocks in the data area, wherein each of the logical blocks includes a plurality of logical pages. The memory controller also receives a data to be written by the host system into a specific logical page among the logical pages through the connector, selects a substitute physical block, writes the data into a specific physical page in the substitute physical block, and records the address of a physical page in which a previous data corresponding to the specific logical page is written into the specific physical page, wherein the substitute physical block is selected from the spare area and mapped to the logical block corresponding to the specific logical page.

As described above, in the present invention, when a host system is about to write a data into a logical page, which physical page a previous data corresponding to the logical page is written into is recorded into the corresponding physical page. Accordingly, even if a power failure occurs to a memory storage device, after the power supply of the memory storage device is resumed, the physical page containing the latest valid data can still be identified among all the physical pages corresponding to the same logical page according to the information recorded in the physical pages. Thereby, any data loss caused by power failure is avoided.

It should be understood, however, that this Summary may not contain all of the aspects and embodiments of the present invention, is not meant to be limiting or restrictive in any manner, and that the invention as disclosed herein is and will be understood by those of ordinary skill in the art to encompass obvious improvements and modifications thereto.

These and other exemplary embodiments, features, aspects, and advantages of the present invention will be described and become more apparent from the detailed description of exemplary embodiments when read in conjunction with accompanying drawings.

BRIEF DESCRIPTION OF THE DRAWINGS

The accompanying drawings are included to provide a further understanding of the present invention, and are incorporated in and constitute a part of this specification. The drawings illustrate embodiments of the present invention and, together with the description, serve to explain the principles of the present invention.

DESCRIPTION OF THE EMBODIMENTS

Reference will now be made in detail to the present preferred embodiments of the present invention, examples of which are illustrated in the accompanying drawings. Wherever possible, the same reference numbers are used in the drawings and the description to refer to the same or like parts.

Embodiments of the present invention may comprise any one or more of the novel features described herein, including in the Detailed Description, and/or shown in the drawings. As used herein, "at least one", "one or more", and "and/or" are open-ended expressions that are both conjunctive and disjunctive in operation. For example, each of the expressions "at least on of A,B and C", "at least one of A, B, or C", "one or more of A, B, and C", "one or more of A, B, or C" and "A, B, and/or C" means A alone, B alone, C alone, A and B together, A and C together, B and C together, or A, B and C together.

It is to be noted that the term "a" or "an" entity refers to one or more of that entity. As such, the terms "a" (or "an"), "one or more" and "at least one" can be used interchangeably herein.

Generally, a memory storage device (also referred to as a memory storage system) includes a memory chip and a controller (also referred to as a control circuit). A memory storage device is usually used along with a host system so that the host system can write data into or read data from the memory storage device. In addition, a memory storage device may also include an embedded memory and a software which can be executed by a host system and substantially served as a controller of the embedded memory.

Figure 1A:
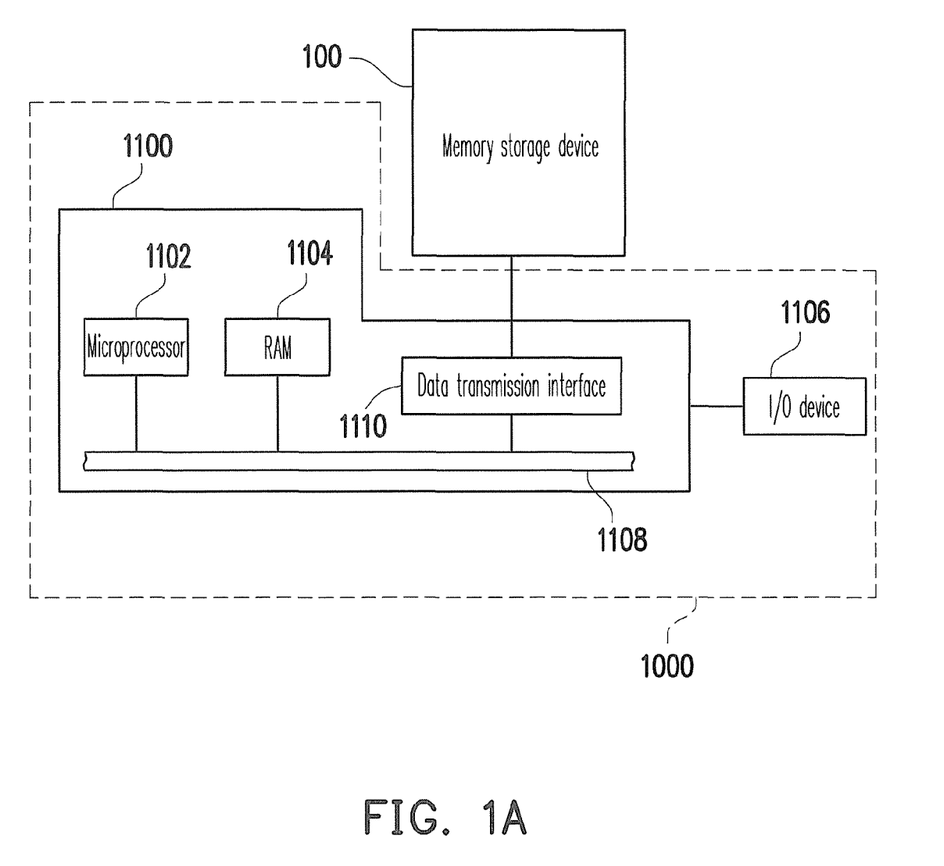
FIG. 1A is a diagram of a host system using a memory storage device according to an exemplary embodiment of the present invention.

FIG. 1A is a diagram of a host system using a memory storage device according to an exemplary embodiment of the present invention.

Figure 1B:
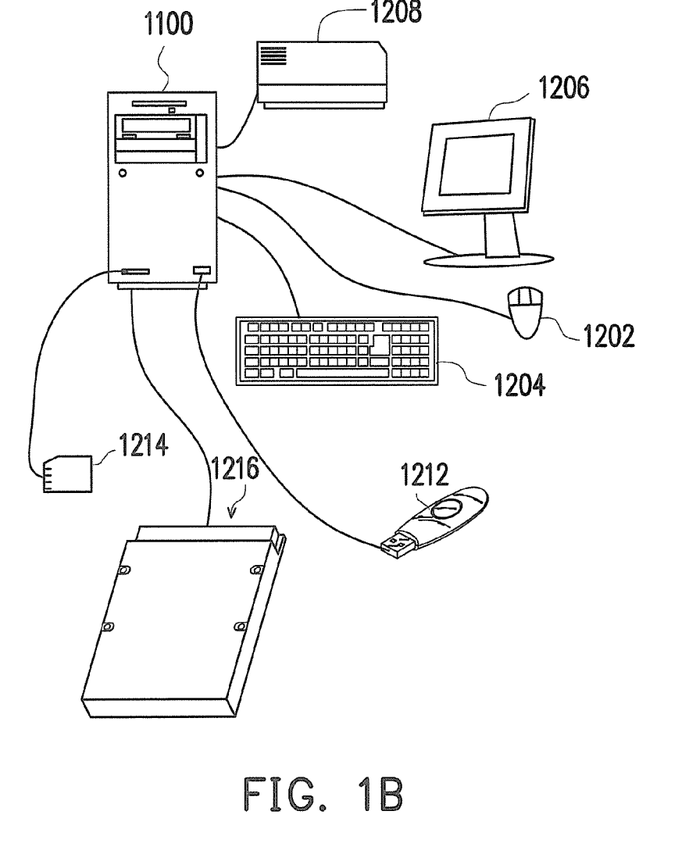
FIG. 1B is a diagram of a computer, an input/output device, and a memory storage device according to an exemplary embodiment of the present invention.

The host system 1000 includes a computer 1100 and an input/output (I/O) device 1106. The computer 1100 includes a microprocessor 1102, a random access memory (RAM) 1104, a system bus 1108, and a data transmission interface 1110. The I/O device 1106 includes a mouse 1202, a keyboard 1204, a display 1206, and a printer 1208, as shown in FIG. 1B. However, the I/O device 1106 is not limited to the devices illustrated in FIG. 2B and may further include other devices.

In the present exemplary embodiment, a memory storage device 100 is coupled to other components of the host system 1000 via the data transmission interface 1110. The host system 1000 can write data into or read data from the memory storage device 100 through operations of the microprocessor 1102, the RAM 1104, and the I/O device 1106. The memory storage device 100 may be a memory card 1214, a flash drive 1212, or a solid state drive (SSD) 1216, as shown in FIG. 1B.

Figure 1C:
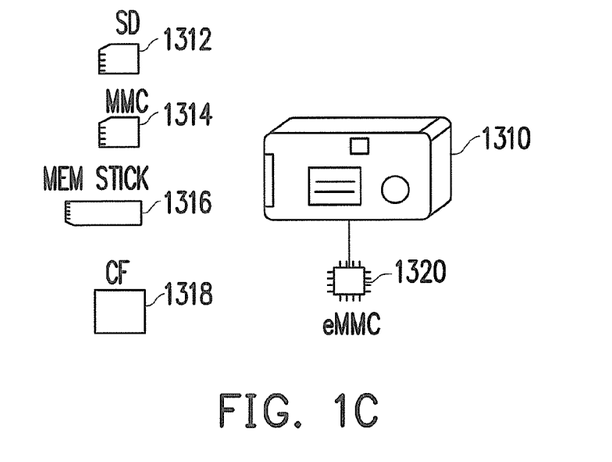
FIG. 1C is a diagram of a host system and a memory storage device according to another exemplary embodiment of the present invention.

Generally speaking, the host system 1000 can be any system that can store data. Even though the host system 1000 is described as a computer system in the present exemplary embodiment, in another exemplary embodiment of the present invention, the host system 1000 may also be a cell phone, a digital camera, a video camera, a communication device, an audio player, or a video player. For example, if the host system is a digital camera 1310, the memory storage device is then a secure digital (SD) card 1312, a multimedia card (MMC) card 1314, a memory stick (MS) 1316, a compact flash (CF) card 1318, or an embedded storage device 1320 (as shown in FIG. 1C) used by the digital camera 1310. The embedded storage device 1320 includes an embedded MMC (eMMC). It should be mentioned that an eMMC is directly coupled to a motherboard of a host system.

Figure 2:
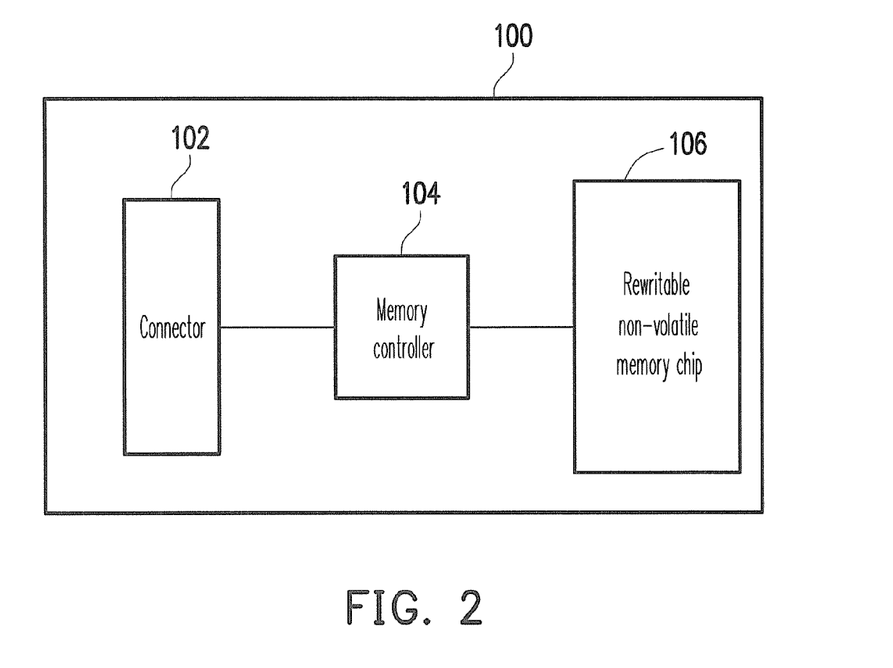
FIG. 2 is a schematic block diagram of the memory storage device in 1A.

FIG. 2 is a schematic block diagram of the memory storage device 100 in 1A. Referring to FIG. 2, the memory storage device 100 includes a connector 102, a memory controller 104, and a rewritable non-volatile memory chip 106.

The connector 102 is coupled to the memory controller 104 and configured to couple to the host system 1000. In the present exemplary embodiment, the connector 102 is a universal serial bus (USB) interface. However, the present invention is not limited thereto, and in other exemplary embodiments, the connector 102 may also be a serial advanced technology attachment (SATA) interface, a multimedia card (MMC) interface, a parallel advanced technology attachment (PATA) interface, an Institute of Electrical and Electronic Engineers (IEEE) 1394 interface, a peripheral component interconnect (PCI) express interface, a SD interface, a MS interface, a CF interface, the integrated drive electronics (IDE) interface, or any other suitable interface.

The memory controller 104 executes a plurality of logic gates or control instructions implemented in a hardware form or a firmware form and performs various data operations on the rewritable non-volatile memory chip 106 according to commands issued by the host system 1000. In particular, the memory controller 104 identifies where valid data is stored after the power supply of the memory storage device 100 is terminated and then resumed through the valid data identification method provided by the present exemplary embodiment. The valid data identification method in the present exemplary embodiment will be described below with reference to accompanying drawings.

The rewritable non-volatile memory chip 106 is coupled to the memory controller 104. The rewritable non-volatile memory chip 106 stores file system information (for example, a file allocation table (FAT) or a new technology file system (NTFS)) and general data (for example, text, image, or audio files). The rewritable non-volatile memory chip 106 may be a multi level cell (MLC) NAND flash memory chip. However, the present invention is not limited thereto, and the rewritable non-volatile memory chip 106 may also be a single level cell (SLC) NAND flash memory chip, any other flash memory chip, or any memory chip having the same characteristics.

Figure 3:
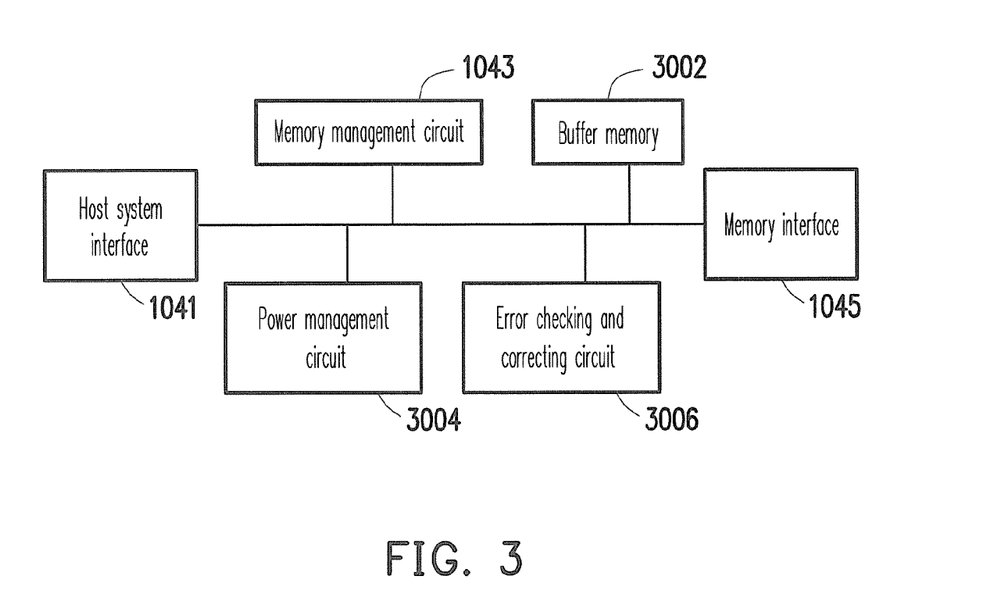
FIG. 3 is a schematic block diagram of a memory controller according to an exemplary embodiment of the present invention.

FIG. 3 is a schematic block diagram of a memory controller according to an exemplary embodiment of the present invention. Referring to FIG. 3, the memory controller 104 includes a host system interface 1041, a memory management circuit 1043, and a memory interface 1045.

The host system interface 1041 is coupled to the memory management circuit 1043 and configured to couple to the host system 1000 via the connector 102. The host system interface 1041 receives and identifies commands and data issued by the host system 1000. Namely, commands and data issued by the host system 1000 are transmitted to the memory management circuit 1043 through the host system interface 1041. In the present exemplary embodiment, the host system interface 1041 is, corresponding to the connector 102, a USB interface. However, in other exemplary embodiments, the host system interface 1041 may also be a SATA interface, a MMC interface, a PATA interface, an IEEE 1394 interface, a PCI express interface, a SD interface, a MS interface, a CF interface, an IDE interface, or any other suitable interface.

The memory management circuit 1043 controls the overall operation of the memory controller 104. To be specific, the memory management circuit 1043 has a plurality of control instructions, and when the memory storage device 100 is in operation, the control instructions are executed to accomplish the valid data identification method in the present exemplary embodiment.

In an exemplary embodiment, the control instructions of the memory management circuit 1043 are implemented in a firmware form. For example, the memory management circuit 1043 has a microprocessor unit (not shown) and a read-only memory (ROM, not shown), and the control instructions are burnt into the ROM. When the memory storage device 100 is in operation, the control instructions are executed by the microprocessor unit to accomplish the valid data identification method in the present exemplary embodiment.

In another exemplary embodiment of the present invention, the control instructions of the memory management circuit 1043 may also be stored in a specific area of the rewritable non-volatile memory chip 106 (for example, a system area exclusively used for storing system data in the rewritable non-volatile memory chip 106) as program codes. In addition, the memory management circuit 1043 has a microprocessor unit (not shown), a ROM (not shown), and a RAM (not shown). The ROM has a driving code, and when the memory controller 104 is enabled, the microprocessor unit first executes the driving code to load the control instructions from the rewritable non-volatile memory chip 106 into the RAM of the memory management circuit 1043. Thereafter, the microprocessor unit runs the control instructions to execute the valid data identification method in the present exemplary embodiment. Moreover, in yet another exemplary embodiment of the present invention, the control instructions of the memory management circuit 1043 may also be implemented in a hardware form.

The memory interface 1045 is coupled to the memory management circuit 1043 so that the memory controller 104 and the rewritable non-volatile memory chip 106 are coupled with each other. Accordingly, the memory controller 104 can perform related operations on the rewritable non-volatile memory chip 106. Namely, data to be written into the rewritable non-volatile memory chip 106 is converted by the memory interface 1045 into a format acceptable to the rewritable non-volatile memory chip 106.

In an exemplary embodiment of the present invention, the memory controller 104 further includes a buffer memory 3002. The buffer memory 3002 may be a static random access memory (SRAM) or a dynamic random access memory (DRAM). However, the present invention is not limited thereto. The buffer memory 3002 is coupled to the memory management circuit 1043 for temporarily storing data from the host system 1000 or the rewritable non-volatile memory chip 106. In the present exemplary embodiment, the buffer memory 3002 also temporarily stores system data (for example, a logical block-physical block mapping table) generated during the operation of the memory storage device 100.

In another exemplary embodiment of the present invention, the memory controller 104 further includes a power management circuit 3004. The power management circuit 3004 is coupled to the memory management circuit 1043 and configured to control the power supply of the memory storage device 100.

In yet another exemplary embodiment of the present invention, the memory controller 104 further includes an error checking and correcting (ECC) circuit 3006. The ECC circuit 3006 is coupled to the memory management circuit 1043 and configured to execute an ECC procedure to ensure data accuracy. To be specific, when the memory management circuit 1043 receives a write command from the host system 1000, the ECC circuit 3006 generates a corresponding ECC code for the data corresponding to the write command, and the memory management circuit 1043 writes the data corresponding to the write command and the corresponding ECC code into the rewritable non-volatile memory chip 106. Subsequently, when the memory management circuit 1043 reads the data from the rewritable non-volatile memory chip 106, it also reads the ECC code corresponding to the data, and ECC circuit 3006 executes the ECC procedure on the data according to the ECC code.

Figure 4A:
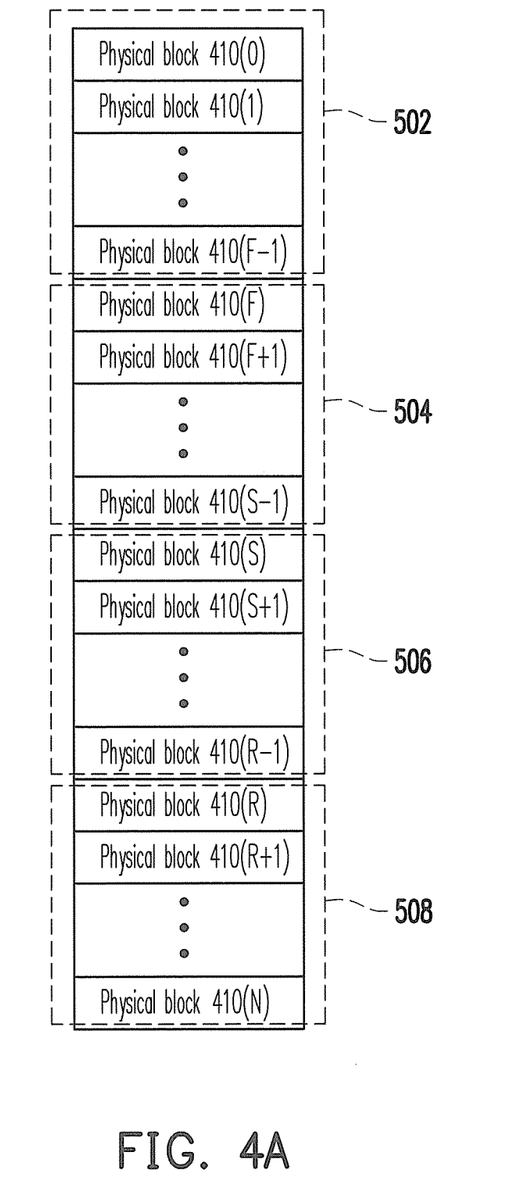
FIG. 4A and FIG. 4B are diagrams illustrating the management of physical blocks according to an exemplary embodiment of the present invention.
Figure 4B:
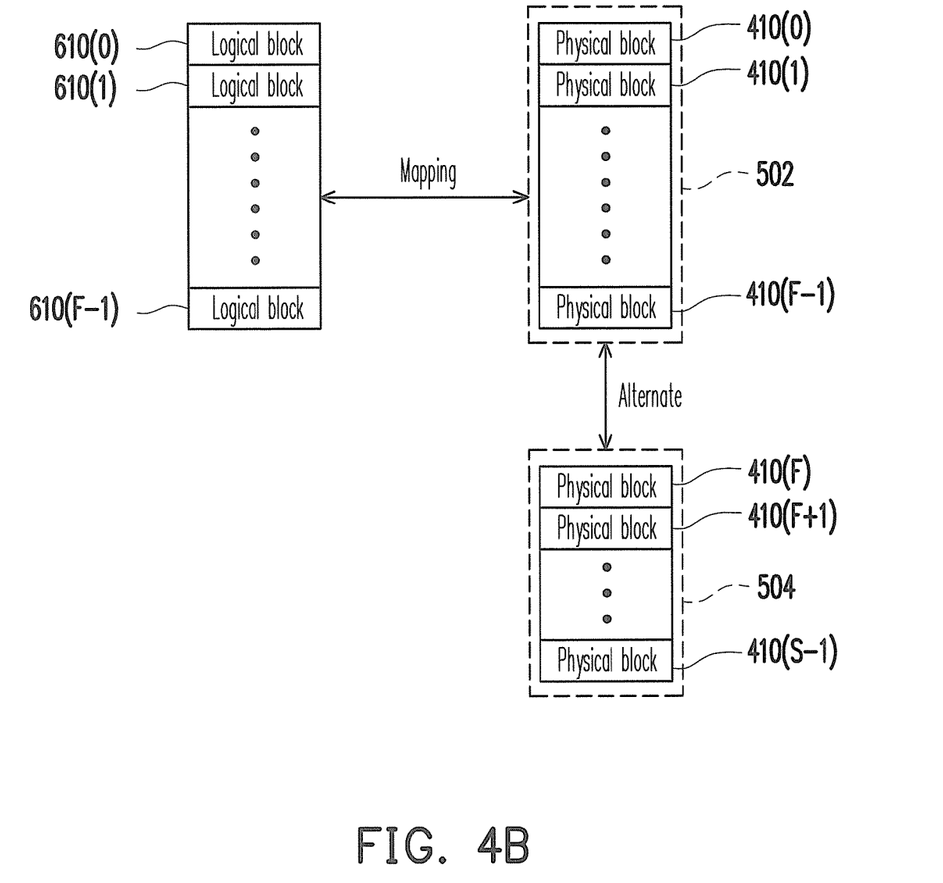

FIG. 4A and FIG. 4B are diagrams illustrating the management of physical blocks according to an exemplary embodiment of the present invention.

Referring to FIG. 4A, the rewritable non-volatile memory chip 106 includes physical blocks 410(0)-410(N), and each of the physical blocks includes a plurality of physical pages. The memory management circuit 1043 of the memory controller 104 logically groups the physical blocks 410(0)-410(N) into a data area 502, a spare area 504, a system area 506, and a replacement area 508. The symbols F, S, R, and N in FIG. 4A are positive integers and respectively represent the numbers of physical blocks in foregoing areas. These numbers can be determined by the manufacturer of the memory storage device 100 according to the capacity of the rewritable non-volatile memory chip 106.

Physical blocks logically belonging to the data area 502 and the spare area 504 are used for storing data from the host system 1000. To be specific, the physical blocks in the data area 502 are considered physical blocks containing data, while the physical blocks in the spare area 504 are used for substituting the physical blocks in the data area 502. In other words, the physical blocks in the spare area 504 are either blank or usable physical blocks (i.e., no data is recorded therein or data recorded therein is already marked as invalid data). When a write command and the data to be written are received from the host system 1000, the memory management circuit 1043 selects a physical block from the spare area 504 and writes the data into the selected physical block, so as to substitute a physical block in the data area 502.

Physical blocks logically belonging to the system area 506 are used for recording system data, such as the manufacturer and model of the rewritable non-volatile memory chip 106, the number of physical blocks of the rewritable non-volatile memory chip 106, the number of physical pages in each physical block, and a logical block-physical block mapping table.

Physical blocks logically belonging to the replacement area 508 are used for replacing damaged physical blocks in the data area 502, the spare area 504, and the system area 506. To be specific, if there are still normal physical blocks in the replacement area 508 and a physical block in the data area 502 is damaged, the memory management circuit 1043 selects a normal physical block from the replacement area 508 to replace the damaged physical block in the data area 502.

Referring to FIG. 4B, in the present exemplary embodiment, the memory management circuit 1043 configures logical blocks 610(0)-610(F-1), wherein the logical blocks 610(0)-610(F-1) are mapped to the physical blocks 410(0)-410(F-1) in the data area 502. To be specific, the logical pages in each logical block are sequentially mapped to the physical pages in the corresponding physical block, and a plurality of logical sectors in each logical page is mapped to physical sectors in the corresponding physical page. The memory management circuit 1043 provides the logical blocks to the host system 1000 and maintains a logical block-physical block mapping table to record the mapping relationship between the logical blocks 610(0)-610(F-1) and the physical blocks 410(0)-410(F-1) in the data area 502. Thus, when the host system 1000 is about to read a specific logical address, the memory management circuit 1043 converts the logical address to be read by the host system 1000 into a corresponding logical block, logical page, or logical sector and reads data from the corresponding physical page of the corresponding physical block according to the logical block-physical block mapping table.

Figure 5A:
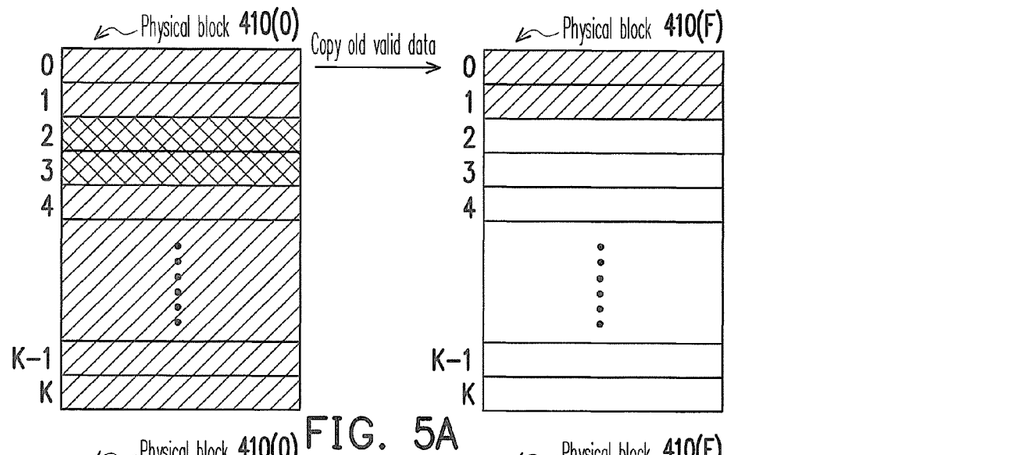
FIGS. 5A-5C are diagrams illustrating the operation of a rewritable non-volatile memory chip according to an exemplary embodiment of the present invention.
Figure 5B:
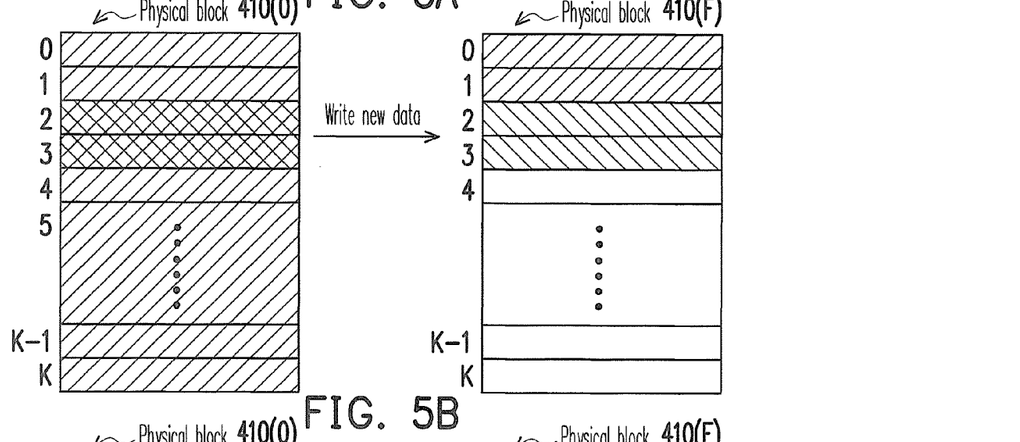
Figure 5C:
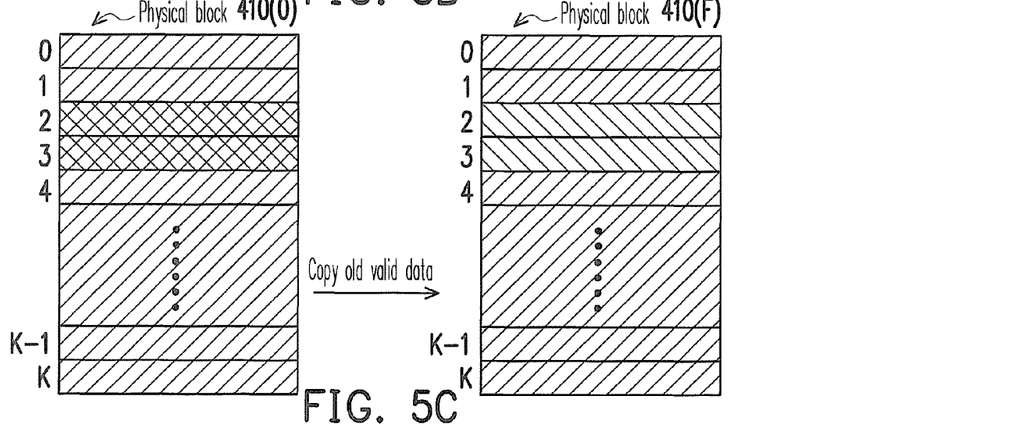

FIGS. 5A-5C are diagrams illustrating the operation of a rewritable non-volatile memory chip according to an exemplary embodiment of the present invention.

Referring to FIGS. 5A-5C, in the present exemplary embodiment, it is assumed that the logical block 610(0) is mapped to the physical block 410(0). When the memory controller 104 receives a write command from the host system 1000 therefore is about to write data into a logical page of the logical block 610(0), the memory management circuit 1043 identifies that the logical block 610(0) is currently mapped to the physical block 410(0) according to the logical block-physical block mapping table and selects a physical block 410(F) from the spare area 504 as a substitute physical block of the physical block 410(0). However, at the same time when the memory management circuit 1043 writes the new data into the physical block 410(F), the memory management circuit 1043 does not instantly move all the valid data in the physical block 410(0) to the physical block 410(F) or erase the physical block 410(0). To be specific, as shown in FIG. 5A, the memory management circuit 1043 copies the valid data before the physical page for writing the new data in the physical block 410(0) (for example, data in the $0^{th}$ physical page and the $1^{st}$ physical page of the physical block 410(0)) into the $0^{th}$ physical page and the $1^{st}$ physical page of the physical block 410(F). Besides, as shown in FIG. 5B, the memory management circuit 1043 writes the new data into the $2^{nd}$ physical page and the $3^{rd}$ physical page of the physical block 410(F). Herein the memory management circuit 1043 completes the data writing operation. Because the valid data in the physical block 410(0) may become invalid during a next operation (for example, a write command), instantly moving all the valid data in the physical block 410(0) to the physical block 410(F) may become meaningless. In addition, since data has to be sequentially written into the physical pages of a physical block, the memory management circuit 1043 moves only the valid data before the physical page for writing the new data first.

In the present exemplary embodiment, the operation for maintaining the temporary mother-child relationship between the physical block 410(0) and the physical block 410(F) is referred to as opening mother-child blocks, wherein the original physical block (i.e., the physical block 410(0)) is referred to as a mother physical block, and the substitute physical block (i.e., the physical block 410(F)) is referred to as a child physical block.

The memory management circuit 1043 only combines the data in the physical block 410(0) and the physical block 410(F) into a physical block when subsequently the contents of the physical block 410(0) and the physical block 410(F) are to be actually merged, so as to improve the efficiency in using these physical blocks. Herein the operation for merging the mother-child blocks is referred to as a data merging procedure or closing mother-child blocks. For example, as shown in FIG. 5C, while closing mother-child blocks, the memory management circuit 1043 copies remaining valid data in the physical block 410(0) (i.e., data in the $4^{th}$-$(K)^{th}$ physical pages of the physical block 410(0)) to the $4^{th}$-$(K)^{th}$ physical pages of the substitute physical block 410(F) and then erases the physical block 410(0) and links it to the spare area 504. Meanwhile, the memory management circuit 1043 links the physical block 410(F) to the data area 502. Namely, the memory management circuit 1043 re-maps the logical block 610(0) to the physical block 410(F) in the logical block-physical block mapping table. Additionally, in the present exemplary embodiment, the memory management circuit 1043 establishes a spare area physical block table (not shown) to record the physical blocks currently linked to the spare area. It should be mentioned that because there is a limited number of physical blocks in the spare area 504, during the operation of the memory storage device 100, the number of currently-opened mother-child block sets is limited. Thus, when the memory storage device 100 receives a write command from the host system 1000, if the number of currently-opened mother-child block sets reaches its upper limit, the memory management circuit 1043 needs to close at least one currently-opened mother-child block set (i.e., executes a mother-child block closing operation), so as to execute the write command.

It should be noted that in the present exemplary embodiment, the physical block 410(0) may have the temporary mother-child relationship with multiple substitute physical blocks selected from the spare area 504. In other words, each mother physical block may have multiple child physical blocks and each child physical block may be corresponding to different data writing modes (or the same data writing mode). The memory management circuit 1043 maintains a mother-child block table to record the correspondence between mother physical blocks and child physical blocks.

For example, when the host system 1000 is about to write continuous data into a logical page of the logical block 610(0), the memory management circuit 1043 identifies that the logical block 610(0) is currently mapped to the physical block 410(0) according to the logical block-physical block mapping table and selects a substitute physical block from the spare area 504 for writing the continuous data. Subsequently, if the host system 1000 is about to update (for example, write back) the continuous data, the memory management circuit 1043 selects another substitute physical block from the spare area 504 to write the update data. Thereafter, if the host system 1000 is about to write data into the logical page again and the quantity of the new data is smaller than a threshold, the memory management circuit 1043 selects another substitute physical block from the spare area 504 for writing the data.

In the present exemplary embodiment, every time when the host system 1000 issues a write command, the memory management circuit 1043 selects a new substitute physical block or writes the data into a selected substitute physical block. If one mother physical block has more than one substitute physical blocks (i.e., child physical blocks), the memory management circuit 1043 selects a substitute physical block for writing data according to the quantity of the data to be written by the host system 1000. Accordingly, before closing a mother physical block and its child physical blocks, valid data of the mother physical block is distributed in the child physical blocks thereof.

Because every time when the host system 1000 is about to write data into a logical page, the memory management circuit 1043 selects a substitute physical block for writing the data according to the quantity of the data, after the host system 1000 performs multiple data writing operations on a specific logical page, several physical pages belonging to the same or different substitute physical blocks may be mapped to the logical page. In this case, every time when the memory management circuit 1043 writes data into a physical page in a substitute physical block, it records a page correspondence information corresponding to the logical page into the buffer memory 3002, so as to record which physical page the latest valid data of the current logical page is recorded, wherein the page correspondence information contains the address of the physical page.

Variables, page correspondence information, or mapping tables generated during the operation of the memory storage device 100 are temporarily stored in the buffer memory 3002, and when the memory storage device 100 is properly powered off, aforementioned information is written into the system area 506 of the rewritable non-volatile memory chip 106. When next time the memory storage device 100 is powered on, foregoing operation-related information is read from the system area 506 back into the buffer memory 3002 to be used by the memory management circuit 1043. However, if a power failure occurs to the memory storage device 100, system information in the buffer memory 3002 may not be written into the system area 506 in time. In order to avoid data loss caused by inadequate system information in the buffer memory 3002 after the memory storage device 100 is powered on again, in the present exemplary embodiment, when the memory management circuit 1043 receives a data to be written by the host system 1000 into a logical page (referred to as a specific logical page thereinafter) through the host system interface 1041, besides selecting a substitute physical block and writing the data into a specific physical page in the substitute physical block, the memory management circuit 1043 further determines whether the host system 1000 has written data into the specific logical page. If the host system 1000 has written data into the specific logical page, the memory management circuit 1043 records in which physical page the previous data corresponding to the specific logical page is written into the specific physical page. If the host system 1000 has not written data into the specific logical page, the memory management circuit 1043 does not performed foregoing recording operation, or, the memory management circuit 1043 writes a specific information into the specific physical page to indicate that no previous data is written. Herein the substitute physical block selected by the memory management circuit 1043 is mapped to a logical block corresponding to the specific logical page. The substitute physical block may be a physical block selected from the spare area 504 in response to the latest write command or a physical block selected from the spare area 504 when the former write command is previously received from the host system 1000.

Figure 6:
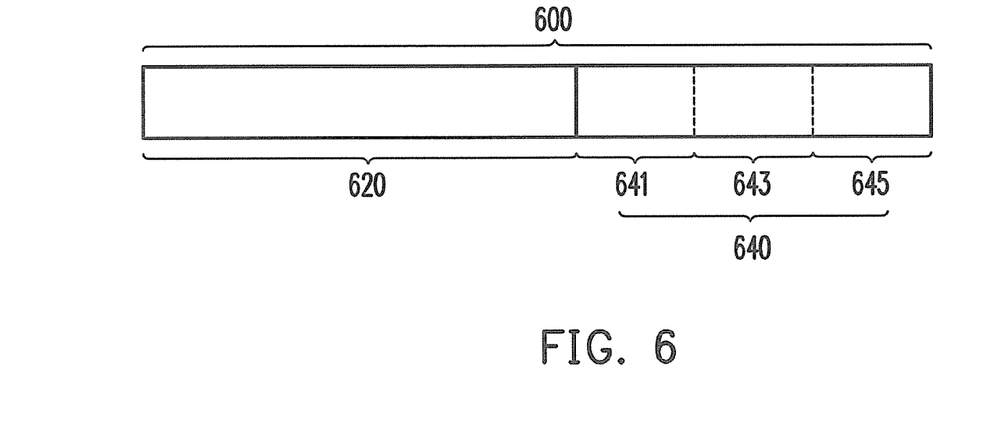
FIG. 6 is a diagram of a physical page in a physical block according to an exemplary embodiment of the present invention.

Below, how the memory management circuit 1043 writes data into a specific physical page will be described with reference to FIG. 6. Referring to FIG. 6, in the present exemplary embodiment, the specific physical page 600 includes a data bit area 620 and a redundant bit area 640. The redundant bit area 640 includes a first recording area 641, a second recording area 643, and a third recording area 645. For example, when the capacity of the specific physical page 600 is 8 kilobytes (KB), the capacity of the redundant bit area 640 is 22 bytes.

In the present exemplary embodiment, the memory management circuit 1043 writes a data into the data bit area 620 of the specific physical page 600. Besides, the memory management circuit 1043 obtains the address of the physical page in which a previous data corresponding to the specific logical page is written according to the page correspondence information in the buffer memory 3002 and records the address of the physical page containing the previous data into the first recording area 641 of the redundant bit area 640. Thereafter, the memory management circuit 1043 updates the page correspondence information in the buffer memory 3002 as the address of the specific physical page.

In addition, the memory management circuit 1043 records the address of the specific logical page into the second recording area 643 of the redundant bit area 640. In other words, the logical page corresponding to the specific physical page 600 can be easily determined according to the content of the redundant bit area 640. The third recording area 645 is used for storing data's ECC codes.

It should be noted that the configurations of the recording areas in the data bit area 620 and the redundant bit area 640 illustrated in FIG. 6 are not intended to limit the scope of the present invention, and in other exemplary embodiments of the present invention, the data bit area and the redundant bit area of each physical page may have other different configurations.

In the present exemplary embodiment, once the memory storage device 100 receives a write command from the host system 1000 during its operation, the memory management circuit 1043 records the corresponding data and the address of a physical page in which a previous data corresponding to the same logical page is written into an appropriate physical page through the technique described above.

In another exemplary embodiment, the address of a physical page in which a previous data corresponding to the same logical page is written is recorded into an appropriate physical page through the technique described above only when a write command for writing data into a specific logical page is received from the host system 1000. For example, only when the memory management circuit 1043 determines that the address of a logical page into which the host system 1000 is about to write data is within a predetermined range (for example, logical addresses 0-1000), the address of a physical page in which a previous data corresponding to the logical page is written is recorded into an appropriate physical page if data has been written into the logical page before by the host system 1000.

After the memory storage device 100 is restarted, to determine the physical page containing the latest valid data of a specific logical page, the memory management circuit 1043 first obtains the physical block (i.e., a mother physical block) mapped to the logical block corresponding to the specific logical page according to a logical block-physical block mapping table and then obtains all the child physical blocks of the mother physical block according to a mother-child block table (these child physical blocks are also physical blocks mapped to the logical block corresponding to the specific logical page).

Regarding all the physical blocks mapped to the logical block corresponding to the specific logical page, the memory management circuit 1043 can check the content recorded in the redundant bit area of each physical page in these physical blocks to find out all the physical pages corresponding to the specific logical page. For example, if the address of the specific logical page is recorded in the second recording area of the redundant bit area of a physical page, the physical page is determined to be corresponding to the specific logical page.

Based on the data writing mechanism adopted by the memory management circuit 1043, it is assumed that the memory management circuit 1043 stores a data to be written by the host system 1000 into a logical page into a physical page P1. Subsequently, if the host system 1000 writes data into the same logical page, the address of the physical page P1 is recorded into the redundant bit area of another physical page. Namely, it is determined that the data stored in a physical page is not the latest valid data as long as the address of the physical page is recorded in the redundant bit area of another physical page. Thus, the memory management circuit 1043 finds out a physical page (in the present exemplary embodiment, this physical page is referred to as a first physical page) having its address not recorded in the redundant bit area of any other physical page among all the physical pages corresponding to the specific logical page and determines that valid data of the specific logical page is written in this physical page.

Thereby, even if a power failure occurs to the memory storage device 100 and accordingly system information in the buffer memory 3002 cannot be stored into the system area 506 of the rewritable non-volatile memory chip 106, the memory management circuit 1043 can still find out where the latest valid data of a specific logical page is stored according to physical page address information recorded in the redundant bit area of each physical page after the memory storage device 100 is restarted.

Figure 7:
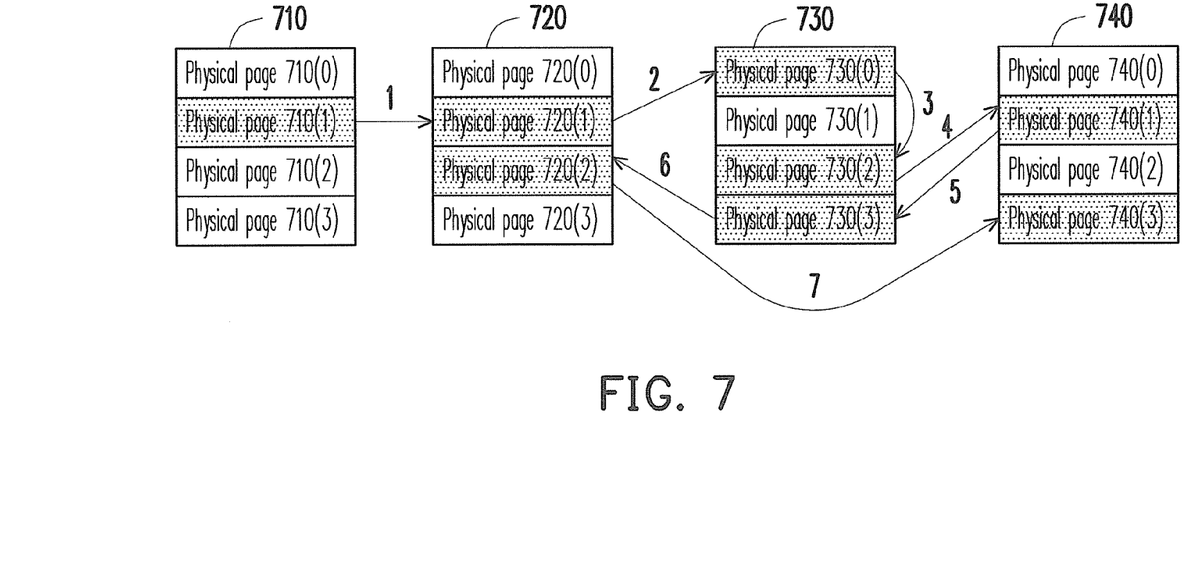
FIG. 7 is a diagram illustrating an operation of writing data into a specific logical page according to an exemplary embodiment of the present invention.

FIG. 7 is a diagram illustrating an operation of writing data into a specific logical page according to an exemplary embodiment of the present invention. As shown in FIG. 7, in the present exemplary embodiment, it is assumed that each physical block has four physical pages, and the numbers accompanying the arrows in FIG. 7 indicate the sequence of data storage operations corresponding to write commands issued by the host system 1000.

To be specific, herein it is assumed that the specific logical page to be written by the host system 1000 is mapped to the physical page 710(1) of the mother physical block 710 and the mother physical block 710 has three child physical blocks (i.e., the child physical blocks 720, 730, and 740). First, if the memory management circuit 1043 writes data into the physical page 720(1) of the child physical block 720, the address of a physical page containing a previous valid data (i.e., the address of the physical page 710(1)) is recorded in the redundant bit area of the physical page 720(1). Then, if the host system 1000 is about to write data into the specific logical page again and the memory management circuit 1043 writes the data into the physical page 730(0) of the child physical block 730, the address of the physical page 720(1) is recorded into the redundant bit area of the physical page 730(0). After that, if the host system 1000 is about to write data into the specific logical page again and the memory management circuit 1043 writes the data into the physical page 730(2) of the child physical block 730, the address of the physical page 730(0) is recorded in the redundant bit area of the physical page 730(2). Similarly, the address of the physical page 730(2) is recorded in the redundant bit area of the physical page 740(1), the address of the physical page 740(1) is recorded in the redundant bit area of the physical page 730(3), the address of the physical page 730(3) is recorded in the redundant bit area of the physical page 720(2), and the address of the physical page 720(2) is recorded in the redundant bit area of the physical page 740(3). The eight dotted physical pages in FIG. 7 are corresponding to the same specific logical page. However, only the data recorded in the physical page 740(3) is the latest valid data.

After the memory storage device 100 is restarted, the memory management circuit 1043 obtains the eight physical pages corresponding to the specific logical page. Because only the address of the physical page 740(3) among the eight physical pages is not recorded in the redundant bit area of any other physical page, the memory management circuit 1043 determines that the data recorded in the physical page 740(3) is the valid data of the specific logical page.

In an exemplary embodiment, after the memory management circuit 1043 identifies where the valid data of the specific logical page is stored, it does not perform any merging operation on the physical blocks. In another exemplary embodiment, the memory management circuit 1043 integrates all the physical blocks mapped to the logical block corresponding to a specific logical page into a new physical block and establishes a mapping relationship between the logical block corresponding to the specific logical page and the new physical block. Namely, the memory management circuit 1043 copies valid data in all the physical blocks mapped to the logical block corresponding to the specific logical page into the new physical block and links the new physical block to the data area 502. Meanwhile, the memory management circuit 1043 erases the data in the original physical blocks and links these physical blocks to the spare area 504.

Figure 8A:
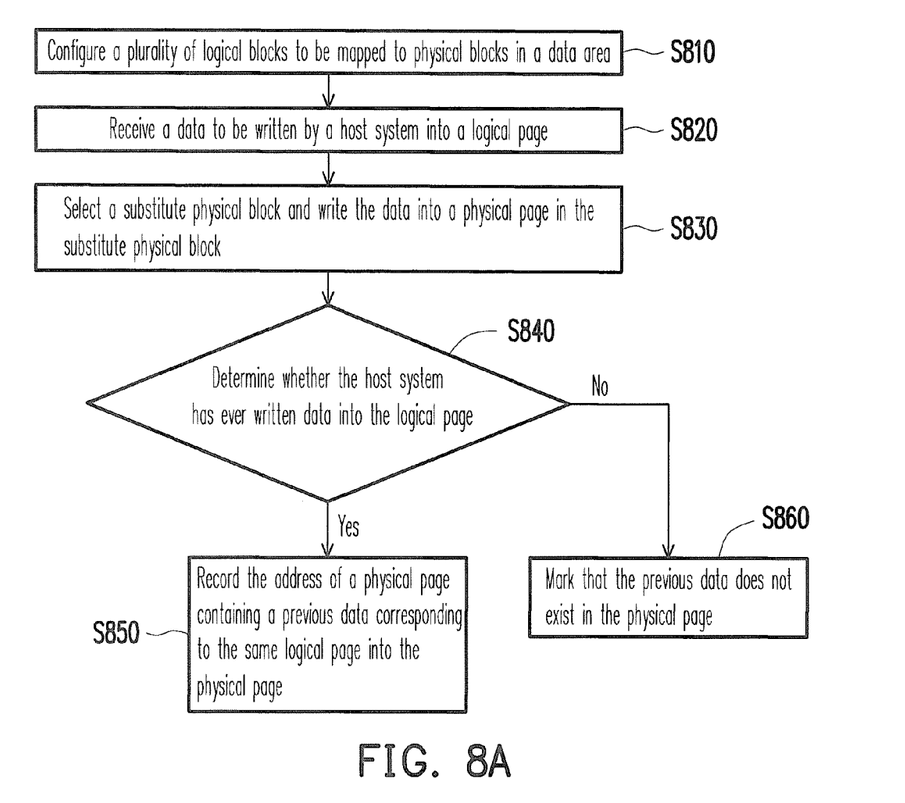
FIG. 8A and FIG. 8B are flowcharts of a valid data identification method according to an exemplary embodiment of the present invention.
Figure 8B:
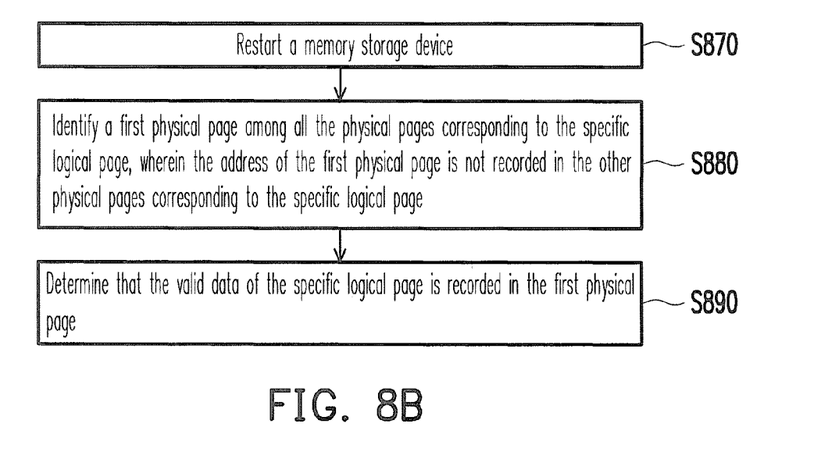

FIG. 8A and FIG. 8B are flowcharts of a valid data identification method according to an exemplary embodiment of the present invention.

As shown in FIG. 8A, first, in step S810, the memory management circuit 1043 of the memory controller 104 configures a plurality of logical blocks to be mapped to the physical blocks in the data area 502 of the rewritable non-volatile memory chip 106, wherein each of the logical blocks includes a plurality of logical pages.

Then, in step S820, the memory controller 104 receives a data to be written by the host system 1000 into a specific logical page among foregoing logical pages, and in step S830, the memory management circuit 1043 selects a substitute physical block and writes the data into a physical page in the substitute physical block.

In step S840, the memory management circuit 1043 determines whether the host system 1000 has ever written data into the logical page. If the host system 1000 has written data into the logical page, in step S850, the memory management circuit 1043 records the address of a physical page containing the previous data corresponding to the same logical page into the physical page. Otherwise, in step S860, the memory management circuit 1043 marks that no previous data is written in the physical page. This step may be done by recording no information into the redundant bit area of the physical page or writing a specific information indicating that no previous data is recorded into the redundant bit area.

In the present exemplary embodiment, during the operation of the memory storage device 100, the memory management circuit 1043 executes steps S820-S860 in response to a write command issued by the host system 1000. In another exemplary embodiment, the memory management circuit 1043 executes steps S840-S860 regarding a logical page satisfying a special condition (for example, the address of the logical page is within a predetermined range).

Thereafter, when a power failure occurs to the memory storage device 100 and the memory storage device 100 is restarted (as in step S870 shown in FIG. 8B), if the memory management circuit 1043 is about to identify where valid data of a specific logical page is stored, in step S880, the memory management circuit 1043 identifies a first physical page among all the physical pages corresponding to the specific logical page, wherein the address of the first physical page is not recorded in the other physical pages corresponding to the specific logical page. Finally, in step S890, the memory management circuit 1043 determines that the valid data of the specific logical page is recorded in the first physical page. The memory management circuit 1043 can find out the physical page storing the latest valid data of each logical page through steps S880 and S890.

As described above, the present invention provides a valid data identification method, a memory storage device, and a memory controller. When a host system is about to write data into a specific logical page, the address of a physical page containing the previous data corresponding to the same logical page is recorded into a corresponding physical page. Thus, regardless of whether the memory storage device is properly powered off or not, when next time the memory storage device is powered on, the physical page containing the latest valid data of the specific logical page can be identified among several physical pages corresponding to the specific logical page based on the information recorded in these physical pages. Thereby, data loss or data error caused by power failure in the memory storage device can be avoided. It should be noted that the advantages aforementioned not required in all versions of the present invention.

It will be apparent to those skilled in the art that various modifications and variations can be made to the structure of the present invention without departing from the scope or spirit of the present invention. In view of the foregoing, it is intended that the present invention cover modifications and variations of this invention provided they fall within the scope of the following claims and their equivalents.

What is claimed is:

1. A valid data identification method, adapted to a memory storage device having a rewritable non-volatile memory chip, wherein the rewritable non-volatile memory chip comprises a plurality of physical blocks, each of the physical blocks comprises a plurality of physical pages, each of the physical pages comprises a data bit area and a redundant bit area, and the physical blocks are grouped into at least a data area and a spare area, the valid data identification method comprising:
    configuring a plurality of logical blocks to be mapped to the physical blocks in the data area, wherein each of the logical blocks comprises a plurality of logical pages;
    receiving a data to be written by a host system into a specific logical page among the logical pages;

selecting a substitute physical block and writing the data into a specific physical page in the substitute physical block, wherein the substitute physical block is selected from the spare area and mapped to the logical block corresponding to the specific logical page;

recording an address of a physical page in which a previous data corresponding to the specific logical page is written into the specific physical page;

identifying a first physical page among all the physical pages corresponding to the specific logical page, wherein an address of the first physical page is not recorded in the other physical pages corresponding to the specific logical page; and determining that a valid data of the specific logical page is written in the first physical page.

2. The valid data identification method according to claim 1 further comprising:

when the data is written into the specific physical page, writing the data into the data bit area of the specific physical page;

recording the address of the physical page in which the previous data is written into a first recording area of the redundant bit area of the specific physical page; and recording an address of the specific logical page into a second recording area of the redundant bit area of the specific physical page.

3. The valid data identification method according to claim 2, wherein the step of identifying the first physical page is executed after the memory storage device is restarted.

4. The valid data identification method according to claim 3, wherein the step of identifying the first physical page among all the physical pages corresponding to the specific logical page comprises:

obtaining all the physical blocks mapped to the logical block corresponding to the specific logical page; and identifying a physical page having an address not recorded in the redundant bit area of each of the other physical pages among all the physical pages corresponding to the specific logical page as the first physical page according to a content of the redundant bit area of each physical page in the obtained physical blocks.

5. The valid data identification method according to claim 3, wherein after the step of determining that the valid data of the specific logical page is written in the first physical page, the valid data identification method further comprises:

integrating all the physical blocks mapped to the logical block corresponding to the specific logical page into a new physical block; and establishing a mapping relationship between the logical block corresponding to the specific logical page and the new physical block.

6. The valid data identification method according to claim 1, wherein after the step of selecting the substitute physical block and writing the data into the specific physical page in the substitute physical block, the valid data identification method further comprises:

determining whether the host system has ever written data into the specific logical page, and executing the step of recording the address of the physical page in which the previous data corresponding to the specific logical page is written into the specific physical page only when the host system has written data into the specific logical page; and when the host system has not written data into the specific logical page, marking n the specific physical page that the previous data does not exist.

7. The valid data identification method according to claim 1, wherein the step of recording the address of the physical page in which the previous data corresponding to the specific logical page is written into the specific physical page is executed when an address of the specific logical page is determined to be within a predetermined range.

8. The valid data identification method according to claim 1, wherein the memory storage device comprises a buffer memory, and the valid data identification method further comprises:

obtaining the address of the physical page in which the previous data is written according to a page correspondence information in the buffer memory; and after recording the address of the physical page in which the previous data is written into the specific physical page, updating the page correspondence information as an address of the specific physical page.

9. The valid data identification method according to claim 1, wherein the step of selecting the substitute physical block and writing the data into the specific physical page in the substitute physical block comprises:

when a number of the substitute physical block is greater than 1, selecting one of the substitute physical block for writing the data according to a quantity of the data.

10. A memory controller, for managing a rewritable non-volatile memory chip in a memory storage device, wherein the rewritable non-volatile memory chip comprises a plurality of physical blocks, each of the physical blocks comprises a plurality of physical pages, and each of the physical pages comprises a data bit area and a redundant bit area, the memory controller comprising:

a host system interface, configured to couple to a host system;

a memory interface, configured to couple to the rewritable non-volatile memory chip; and a memory management circuit, coupled to the host system interface and the memory interface, grouping the physical blocks into at least a data area and a spare area and configuring a plurality of logical blocks to be mapped to the physical blocks in the data area, wherein each of the logical blocks comprises a plurality of logical pages, the memory management circuit further receives a data to be written by the host system into a specific logical page among the logical pages through the host system interface, selects a substitute physical block, writes the data into a specific physical page in the substitute physical block, and records an address of a physical page in which a previous data corresponding to the specific logical page is written into the specific physical page, wherein the substitute physical block is selected from the spare area and mapped to the logical block corresponding to the specific logical page, wherein the memory management circuit further identifies a first physical page among all the physical pages corresponding to the specific logical page, wherein an address of the first physical page is not recorded in the other physical pages corresponding to the specific logical page, and the memory management circuit determines that a valid data of the specific logical page is written in the first physical page.

11. The memory controller according to claim 10, wherein the memory management circuit further writes the data into the data bit area of the specific physical page, records the address of the physical page in which the previous data is written into a first recording area of the redundant bit area of the specific physical page, and records an address of the specific logical page into a second recording area of the redundant bit area of the specific physical page.

12. The memory controller according to claim 11, wherein the memory management circuit identifies the first physical page after the memory storage device is re-started.

13. The memory controller according to claim 12, wherein the memory management circuit further obtains all the physical blocks mapped to the logical block corresponding to the specific logical page and identifies a physical page having an address not recorded in the redundant bit area of each of the other physical pages among all the physical pages corresponding to the specific logical page as the first physical page according to a content of the redundant bit area of each physical page in the obtained physical blocks.

14. The memory controller according to claim 12, wherein after determining that the valid data of the specific logical page is written in the first physical page, the memory management circuit further integrates all the physical blocks mapped to the logical block corresponding to the specific logical page into a new physical block and establishes a mapping relationship between the logical block corresponding to the specific logical page and the new physical block.

15. The memory controller according to claim 10, wherein the memory management circuit determines whether the host system has ever written data into the specific logical page, wherein when the host system has written data into the specific logical page, the memory management circuit records the address of the physical page in which the previous data corresponding to the specific logical page is written into the specific physical page, when the host system has not written data into the specific logical page, the memory management circuit marks in the specific physical page that the previous data does not exist.

16. The memory controller according to claim 10, wherein the memory management circuit only records the address of the physical page in which the previous data is written into the specific physical page when an address of the specific logical page is within a predetermined range.

17. The memory controller according to claim 10 further comprising:

a buffer memory, coupled to the memory management circuit, recording a page correspondence information, wherein the memory management circuit further obtains the address of the physical page in which the previous data is written according to the page correspondence information and updates the page correspondence information as an address of the specific physical page after recording the address of the physical page in which the previous data is written into the specific physical page.

18. The memory controller according to claim 10, wherein when a number of the substitute physical block is greater than 1, the memory management circuit further selects one of the substitute physical block for writing the data according to a quantity of the data.

19. A memory storage device, comprising:

a rewritable non-volatile memory chip, comprising a plurality of physical blocks, wherein each of the physical blocks comprises a plurality of physical pages, and each of the physical pages comprises a data bit area and a redundant bit area;

a connector, configured to couple to a host system; and a memory controller, coupled to the rewritable non-volatile memory chip and the connector, grouping the physical blocks into at least a data area and a spare area and configuring a plurality of logical blocks to be mapped to the physical blocks in the data area, wherein each of the logical blocks comprises a plurality of logical pages, the memory controller further receives a data to be written by the host system into a specific logical page among the logical pages through the connector, selects a substitute physical block, writes the data into a specific physical page in the substitute physical block, and records an address of a physical page in which a previous data corresponding to the specific logical page is written into the specific physical page, wherein the substitute physical block is selected from the spare area and mapped to the logical block corresponding to the specific logical page, wherein the memory controller further identifies a first physical page among all the physical pages corresponding to the specific logical page, wherein an address of the first physical page is not recorded in the other physical pages corresponding to the specific logical page, and the memory controller determines that a valid data of the specific logical page is written in the first physical page.

20. The memory storage device according to claim 19, wherein the memory controller further writes the data into the data bit area of the specific physical page, records the address of the physical page in which the previous data is written into a first recording area of the redundant bit area of the specific physical page, and records an address of the specific logical page into a second recording area of the redundant bit area of the specific physical page.

21. The memory storage device according to claim 20, wherein the memory controller identifies the first physical page after the memory storage device is restarted.

22. The memory storage device according to claim 21, wherein the memory controller further obtains all the physical blocks mapped to the logical block corresponding to the specific logical page and identifies a physical page having an address not recorded in the redundant bit area of each of the other physical pages among all the physical pages corresponding to the specific logical page as the first physical page according to a content of the redundant bit area of each physical page in the obtained physical blocks.

23. The memory storage device according to claim 21, wherein after determining that the valid data of the specific logical page is written in the first physical page, the memory controller further integrates all the physical blocks mapped to the logical block corresponding to the specific logical page into a new physical block and establishes a mapping relationship between the logical block corresponding to the specific logical page and the new physical block.

24. The memory storage device according to claim 19, wherein the memory controller determines whether the host system has ever written data into the specific logical page, wherein when the host system has written data into the specific logical page, the memory controller records the address of the physical page in which the previous data corresponding to the specific logical page is written into the specific physical page, when the host system has not written data into the specific logical page, the memory controller marks in the specific physical page that the previous data does not exist.

25. The memory storage device according to claim 19, wherein the memory controller only records the address of the physical page in which the previous data is written into the specific physical page when an address of the specific logical page is within a predetermined range.

26. The memory storage device according to claim 19, wherein the memory controller further comprises a buffer memory for recording a page correspondence information, wherein the memory controller further obtains the address of the physical page in which the previous data is written according to the page correspondence information and updates the page correspondence information as an address of the specific physical page after recording the address of the physical page in which the previous data is written into the specific physical page.

27. The memory storage device according to claim 19, wherein when a number of the substitute physical block is greater than 1, the memory controller further selects one of the substitute physical block for writing the data according to a quantity of the data.

* * * * *